United States Patent
Fu et al.

(10) Patent No.: US 11,184,435 B2
(45) Date of Patent: Nov. 23, 2021

(54) MESSAGE TRANSMISSION METHOD AND APPARATUS IN CLUSTER FILE SYSTEM

(71) Applicant: Huawei Technologies Co., Ltd., Shenzhen (CN)

(72) Inventors: Weiwei Fu, Hangzhou (CN); Canquan Shen, Hangzhou (CN); Bin Wu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/552,817

(22) Filed: Aug. 27, 2019

(65) Prior Publication Data
US 2019/0387053 A1 Dec. 19, 2019

Related U.S. Application Data

(63) Continuation of application No. PCT/CN2017/105898, filed on Oct. 12, 2017.

(30) Foreign Application Priority Data

Feb. 28, 2017 (CN) .......................... 201710114726.1

(51) Int. Cl.
*H04L 29/08* (2006.01)
*G06F 3/06* (2006.01)
(Continued)

(52) U.S. Cl.
CPC .......... *H04L 67/1034* (2013.01); *G06F 3/067* (2013.01); *G06F 3/0617* (2013.01);
(Continued)

(58) Field of Classification Search
CPC ..... H04L 67/1034; H04L 45/22; G06F 3/067; G06F 3/0635; G06F 3/0617; G06F 9/546; G06F 11/0709
See application file for complete search history.

(56) References Cited

U.S. PATENT DOCUMENTS 7,565,568 B1 7/2009 Kumar et al.
7,606,986 B1 * 10/2009 Limaye .................. H04L 69/40
711/112
(Continued)

FOREIGN PATENT DOCUMENTS

CN  103166800 A  6/2013
CN  105511805 A  4/2016
(Continued)

OTHER PUBLICATIONS

Foreign Communication From A Counterpart Application, European Application No. 17898543.8, Extended European Search Report dated Oct. 24, 2019, 9 pages.
(Continued)

*Primary Examiner* — Azizul Choudhury
(74) *Attorney, Agent, or Firm* — Conley Rose, P.C.

(57) ABSTRACT

A message transmission method and apparatus in a cluster file system includes determining, by a first host in a cluster file system, that the message network link is faulty; switching from the message network link for message transmission to a storage channel; generating a first message; and recording the first message in a first location area of a data storage medium, where the first location area is used by a second host to access and read the first message.

17 Claims, 5 Drawing Sheets

(51) Int. Cl.
*G06F 9/54* (2006.01)
*G06F 11/07* (2006.01)
*H04L 12/707* (2013.01)

(52) U.S. Cl.
CPC ............ *G06F 3/0635* (2013.01); *G06F 9/546* (2013.01); *G06F 11/0709* (2013.01); *H04L 45/22* (2013.01)

(56) References Cited

U.S. PATENT DOCUMENTS

| | | | |
|---|---|---|---|
| 7,937,617 | B1 | 5/2011 | Nagineni et al. |
| 9,647,933 | B1* | 5/2017 | Tawri ................. H04L 61/6022 |
| 2003/0182593 | A1* | 9/2003 | Emberty .................. H04L 1/22 714/5.11 |
| 2003/0187847 | A1* | 10/2003 | Lubbers .............. G06F 11/2082 |
| 2006/0015770 | A1* | 1/2006 | Dicorpo ............. G06F 11/2053 714/5.1 |
| 2007/0053283 | A1 | 3/2007 | Bidwell et al. |
| 2007/0073828 | A1 | 3/2007 | Rao et al. |
| 2011/0179317 | A1 | 7/2011 | Yamamoto et al. |
| 2015/0280959 | A1 | 10/2015 | Vincent |
| 2016/0142283 | A1 | 5/2016 | Bennett et al. |

FOREIGN PATENT DOCUMENTS

| | | |
|---|---|---|
| CN | 105607590 A | 5/2016 |
| CN | 106462544 A | 2/2017 |

OTHER PUBLICATIONS

Machine Translation and Abstract of Chinese Publication No. CN103166800, dated Jun. 19, 2013, 10 pages.
Jiang, Z., et al. "Key Technology in Distributed File System Towards Big Data Analysis," Computer Research and Development, Journal of Computer Research and Development, Feb. 2014, 13 pages. With English abstract.
Foreign Communication From A Counterpart Application, PCT Application No. PCT/CN2017/105898, English Translation of International Search Report dated Dec. 28, 2017, 2 pages.
Foreign Communication From A Counterpart Application, PCT Application No. PCT/CN2017/105898, English Translation of Written Opinion dated Dec. 28, 2017, 3 pages.
Machine Translation and Abstract of Chinese Publication No. CN105511805, dated Apr. 20, 2016, 25 pages.
Foreign Communication From A Counterpart Application, Chinese Application No. 201710114726.1, Chinese Office Action dated Dec. 4, 2019, 5 pages.

* cited by examiner

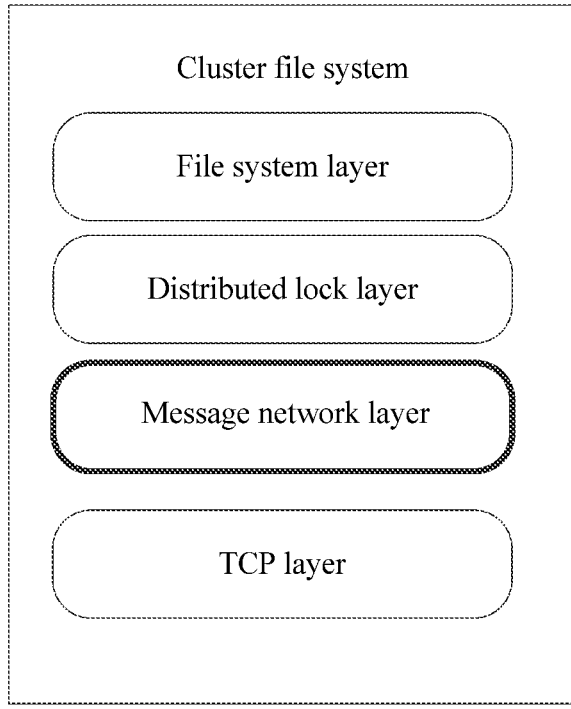

FIG. 3

| A first host determines that a message network link is faulty, and switches a message transmission channel from a message network link to a storage channel | 401 |

| When generating a first message to be sent to a second host, the first host records the first message in a first location area of a data storage medium, where the first location area is used by the second host to access and read the first message | 402 |

| The first host accesses a second location area of the data storage medium, and reads a second message that is recorded by the second host in the second location area | 403 |

FIG. 4

MESSAGE TRANSMISSION METHOD AND APPARATUS IN CLUSTER FILE SYSTEM

CROSS-REFERENCE TO RELATED APPLICATIONS

This application is a continuation application of International Application No. PCT/CN2017/105898, filed on Oct. 12, 2017, which claims priority to China Patent 201710114726.1, filed on Feb. 28, 2017. The disclosures of the aforementioned applications are hereby incorporated by reference in their entireties.

TECHNICAL FIELD

This application relates to the field of communications technologies, and in particular, to a message transmission method and apparatus in a cluster file system.

BACKGROUND

With popularization of high-performance and high-reliability storage area network (SAN) devices, a centralized sharing storage has become the top choice for many distributed systems. Especially, in a server virtualization platform, a plurality of hosts usually share an Internet-protocol storage area network (IP-SAN) storage and a fibre-channel storage area network (FC-SAN) storage. To support more abundant storage applications, a cluster file system usually needs to be deployed on the sharing storage such that each host can use the sharing storage flexibly and conveniently.

The cluster file system is a file system that runs on a plurality of computers (that is, hosts), where the hosts communicate with each other in a manner in order to integrate and virtualize all storage space resources in a cluster, and provide a file access service for the outside. The cluster file system relies on communication between hosts, and the hosts exchange a message with each other to implement a protocol in order to ensure access to the sharing storage without a conflict. Currently, the most popular communication manner between the hosts is to transmit a message between hosts in a manner of sending and receiving the message using a message network. The message network is one of the most important components in most cluster file systems. However, the message network itself is not reliable, and is easily affected by various network faults, such as link interruption, an IP conflict, and a switch fault. In addition, during actual deployment, because quantities of network adapters and switches are limited, the message network and a service network of the cluster file system are usually deployed on a same plane. Once traffic of service messages is extremely large, availability of the message network of the cluster file system is easily affected, and an instant or a long-term fault in the message network is caused. For the cluster file system, a fault in the message network is usually critical. To ensure security of data and metadata in the cluster file system, if a host cannot correctly implement a locking or unlocking operation using the message network, the host is prohibited from accessing a file. In this case, even if a storage link is connected, a data storage becomes unavailable.

An existing cluster file system mainly uses the following two technologies to resolve the fault in the message network. One technology is to restart a host when the host detects that the message network is faulty. In most scenarios requiring high performance and reliability, for example, in a server virtualization scenario, once a host is restarted, all virtual machines running on the host are abnormally shut down, and consequently a service is interrupted, even key data is lost, and an immeasurable loss is caused. Therefore, in a scenario in which a network management environment is poor and the network is frequently disconnected in an intermittent manner, a result that the hosts are frequently restarted cannot be accepted in a production environment.

The other technology is to set a cluster state of a host to be temporarily unavailable when the host detects that the message network is faulty. The host automatically exits from the cluster, and is prohibited from continuing to access data storage. Because a virtual machine cannot access the sharing storage, a service is interrupted, and a virtual machine input/output (I/O) is stuck for a long time or even a blue screen of death occurs. In this case, a manner of virtual machine high availability (HA) is usually used, that is, the virtual machine is shut down and then is started up by a cluster management system on another normal host. After a network of the faulty host is recovered, the virtual machine may be re-migrated. In the process, a service of the virtual machine is interrupted for a relatively long time. In addition, because the network is intermittently disconnected, the host frequently exits from and joins the cluster, and consequently the scenario is extremely complex, and management costs and an error risk are extremely high.

In conclusion, in other approaches, all manners of resolving a fault in the message network of the cluster file system result in disadvantages in another aspect. Even if the storage link is normally connected, all virtual machines in the host are still prohibited from accessing the data storage or even the host is restarted. From a perspective of a client, a large quantity of virtual machines are shut down or in an HA state. Consequently, the service is interrupted for a long time, and even data is lost.

SUMMARY

Embodiments of this application provide a message transmission method and apparatus in a cluster file system in order to resolve problems of abnormal communication between hosts, long time interruption of a service, and even a data loss that are caused when a message network of a cluster file system is faulty.

The embodiments of this application provide the following specific technical solutions.

According to a first aspect, the message transmission method in the cluster file system is provided. The cluster file system includes at least two hosts, and it is assumed that any two hosts are a first host and a second host. The cluster file system further includes a message network link and a data storage medium. The message network link is used for message transmission between the first host and the second host when the link is normal, and the data storage medium is configured to store file information of the cluster file system. A storage channel further exists in the cluster file system. The storage channel is used to connect the first host and the data storage medium, and connect the second host and the data storage medium such that the first host and the second host perform message transmission using the data storage medium when the message network link is faulty. When detecting that the message network is faulty, the first host switches from the message network channel to the storage channel for message transmission. In this way, when the message network is faulty, particularly, when the network is intermittently disconnected, long time interruption of a service and even a data loss that are caused due to host restarting and HA of a large quantity of virtual machines can be avoided such that normal communication between hosts is ensured, normal access of the cluster file system is ensured, and the service is not interrupted.

In a possible design, the first host determines that the message network link is faulty, and switches a message transmission channel from the message network link to the storage channel. When generating a first message to be sent to the second host, the first host records the first message in a first location area of the data storage medium, and the first location area is used by a second host to access and read the first message. Similarly, the first host may also access a second location area of the data storage medium, and read a second message that is recorded by the second host in the second location area. A network of the storage channel is a dedicated network, and link reliability of the storage channel is significantly higher than that of the message network link in order to ensure normal service exchange between the first host and the second host.

In a possible design, after determining that the message network link is faulty, the first host continues to monitor the message network link, and after determining that the message network link recovers to normal, switches the message transmission channel from the storage channel to the message network link. Considering that the message network link can perform notification in time, and a delay is relatively low, after the message network link recovers to normal, the message transmission channel is switched back to the message network link for message transmission. It can ensure timeliness of message transmission between hosts, and can avoid a problem that storage bandwidth is occupied and I/O performance is affected because the storage channel is always occupied for message transmission.

In a possible design, the cluster file system includes N hosts, the data storage medium includes an N-order square matrix, an element in an $i^{th}$ row and a $j^{th}$ column of the N-order square matrix represents a location area ij, the location area ij is used by an $i^{th}$ host to record a message to be sent to a $j^{th}$ host, and is used by the $j^{th}$ host to access and read the message recorded by the $i^{th}$ host, where N≥2, 1≤i≤N, 1≤j≤N, i, j, and N are positive integers, and i≠j. Therefore, a storage channel from any source node to any destination node is independent of each other.

In a possible design, the first host accesses the second location area of the data storage medium, queries a first index and a second index that are carried in a header area of the second location area, and reads an unread message when determining, according to the first index and the second index, that there is the unread message, where the first index is used to represent a location that is in the second location area and in which the first host reads a message, and the second index is used to represent a location that is in the second location area and in which the second host records a message. Similarly, the method may also be used when the second host accesses and reads the first message.

In a possible design, the first host runs an msg_disk process, and the msg_disk process is responsible for polling and reading the second location area in order to obtain a message that is recorded by the second host on the storage channel. The first host enables an msg_disk process for each attached volume, and disables the process when the volume is detached.

According to a second aspect, a message transmission apparatus in a cluster file system is provided. The apparatus has a function of implementing a behavior of the first host according to any one of the first aspect or the possible designs of the first aspect. The function may be implemented by hardware, or may be implemented by executing corresponding software using hardware. The hardware or the software includes one or more modules corresponding to the foregoing function.

According to a third aspect, a message transmission apparatus in a cluster file system is provided. The apparatus includes a transceiver, a memory, and a processor. The memory is configured to store a group of programs, and the processor is configured to invoke the program stored in the memory, to execute the method according to any one of the first aspect or the possible designs of the first aspect.

According to a fourth aspect, a computer storage medium is provided, configured to store a computer software instruction used by the first host according to any one of the first aspect or the possible designs of the first aspect, and the instruction includes a program that is designed to execute any one of the first aspect or the possible designs of the first aspect.

According to a fifth aspect, a cluster file system is provided. The cluster file system includes at least two hosts, and it is assumed that any two hosts are a first host and a second host. The cluster file system further includes a message network link and a data storage medium, and the first host may be configured to execute the method according to any one of the first aspect and the possible designs of the first aspect.

BRIEF DESCRIPTION OF DRAWINGS

FIG. 3 is a schematic diagram of an internal architecture layer of a cluster file system according to an embodiment of this application;

FIG. 4 is a first flowchart of a message transmission method in a cluster file system according to an embodiment of this application;

DESCRIPTION OF EMBODIMENTS

The following describes in detail the embodiments of this application with reference to accompanying drawings.

Figure 1:
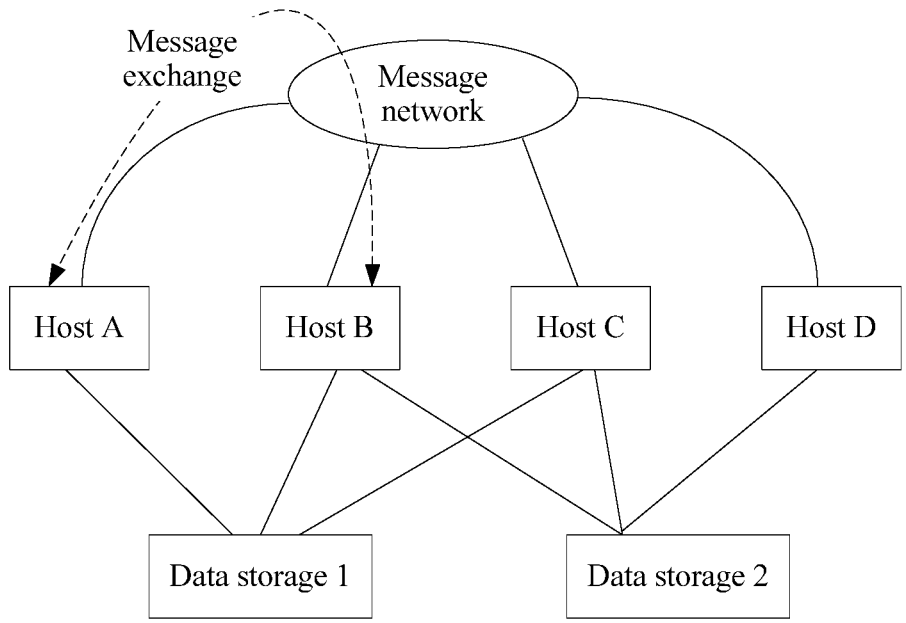
FIG. 1 is a schematic diagram of message exchange between hosts in a cluster file system according to an embodiment of this application.

The solutions provided in the embodiments of this application may be applied to a cluster file system, and the cluster file system is a file system that runs on at least two hosts, integrates all storage space resources in a cluster, and provides a file access service for the outside. When a message network is normally connected, a message is transferred between hosts through the message network. As shown in FIG. 1, a host A, a host B, and a host C in the cluster file system share a data storage 1, and the host B, the host C, and a host D share a data storage 2. The host A needs to perform a write operation on a file in the data storage 1, but the host B is performing an operation on the file, and occupies a write lock of the file. The host A and the host B exchange a message through the message network. In an embodiment, the host A sends, through the message network, a message to the host B to request for locking, and the host B replies with a negative acknowledgement (NACK) message indicating that the host B is performing an operation on the file. The locking fails. When accessing by the host B to the file ends, the host B replies to the host A with a message indicating that locking is allowed. After receiving the message, the host A determines that locking succeeds, and then performs the write operation on the file.

Figure 2:
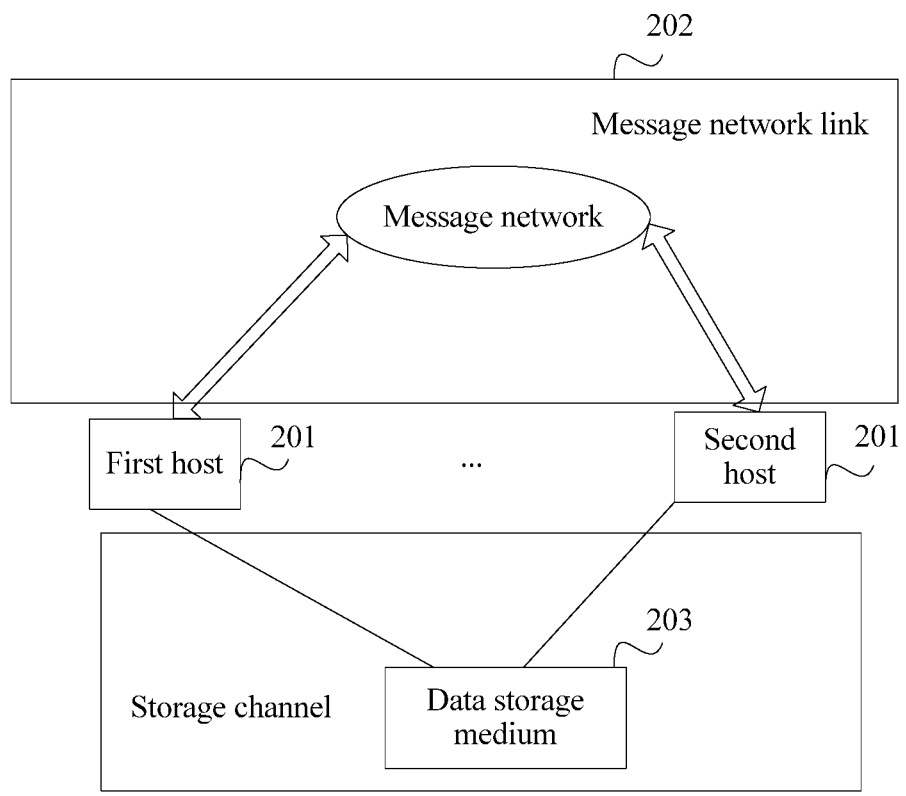
FIG. 2 is a schematic diagram of an architecture of a cluster file system according to an embodiment of this application.

As shown in FIG. 2, the cluster file system in this embodiment of this application includes at least two hosts 201, for example, a first host 201 and a second host 201 that are used to represent any two hosts, and further includes a message network link 202 and a data storage medium 203. The message network link 202 is a channel used for message transmission between hosts 201. The message network link in this application may also be referred to as a message network channel. For example, the message network link 202 is used for message transmission between the first host 201 and the second host 201. The data storage medium 203 is configured to store file information of the cluster file system. For example, the data storage medium 203 may be a disk. It should be noted that, for ease of display, FIG. 2 shows only the first host 201 and the second host 201, and another host that may be included in the cluster file system is not shown. A manner of message transmission between the first host 201 and the second host 201 is applicable to any host in the cluster file system. Only one data storage medium 203 is shown, another data storage medium that may be included in the cluster file system is not shown, and each host 201 may share two or more data storage media 203.

As shown in FIG. 3, the cluster file system mainly includes four layers, including a file system layer, a distributed lock layer, a message network layer, and a Transmission Control Protocol (TCP) layer. The file system layer includes main functions of the cluster file system, such as disk layout, file operation, and metadata management. The file system layer is equivalent to any standalone file system such as extended file system 3 (Ext 3), Ext 4, and New Technology File System (NTFS). The distributed lock layer is a file access control layer on which a distributed-lock-based cluster file system relies. The distributed lock layer specifies a protocol in which hosts access a sharing file without a conflict. The protocol mainly includes two parts such as a message transmission protocol and a lock management protocol. The message network layer is responsible for message communication between hosts. The TCP layer is a kernel network module, and is responsible for processing of an underlying network protocol.

Each host in the cluster file system can transfer messages through the message network when the message network is normal. These messages mainly include two types such as a network heartbeat and a distributed lock management message. The network heartbeat is used for member management in the cluster such that each host learns of states of all hosts in the cluster in order to facilitate decision management. Each host receives and sends various distributed lock management messages, to lock or unlock a file, determine an order of each host for accessing the file, ensure access of the file without a conflict, and avoid damage on file system data or metadata due to concurrent operations of a plurality of hosts.

In this embodiment of this application, each host in the cluster file system transfers a message using a dual-channel. As shown in FIG. 1, in addition to an original message network channel, a storage channel is further deployed. The message network channel may also be referred to as a message network link, and is a main channel for message exchange between hosts. The storage channel is used to connect the first host 201 and the data storage medium 203, and is further used to connect the second host 201 and the data storage medium 203. The storage channel exists in the data storage medium in the cluster file system. A message transmitted between hosts is represented using a change recorded in a specific location in the storage medium. A network of the storage channel is a dedicated network, and link reliability is significantly higher than the message network link. When the host detects that the message network is faulty, the host switches from the message network channel to the storage channel for message transmission, and reconnection is performed on the message network. Once the message network is reconnected, that is, the network fault is rectified, the host switches from the storage channel to the message network for message transmission. In this way, when the message network is faulty, particularly, when the network is intermittently disconnected, long time interruption of a service and even a data loss that are caused due to host restarting and HA of a large quantity of virtual machines can be avoided such that normal communication between hosts is ensured, normal access of the cluster file system is ensured, and the service is not interrupted.

Based on the architectural diagram of the cluster file system shown in FIG. 2, the following describes in detail a message transmission method in a cluster file system in an embodiment of this application with reference to a specific embodiment.

In this embodiment of this application, another channel for message transmission between hosts 201 is created, and is referred to as a storage channel, and the storage channel is used for message transmission between hosts using a data storage medium.

As shown in FIG. 4, the message transmission method in the cluster file system in this embodiment of this application includes the following steps.

Step 401: A first host determines that a message network link is faulty, and switches a message transmission channel from the message network link to a storage channel.

Step 402: When generating a first message to be sent to a second host, the first host records the first message in a first location area of a data storage medium, where the first location area is used by the second host to access and read the first message.

Step 403: The first host accesses a second location area of the data storage medium, and reads a second message that is recorded by the second host in the second location area.

In an embodiment, after detecting that the message network is faulty, the first host enables the storage channel. Meanwhile, the first host continues to monitor the message network link, and after determining that the message network link recovers to normal, re-switches the message transmission channel from the storage channel to the message network link, and performs message transmission with the second host using the message network link. In this way, a disadvantage of low communication efficiency that is caused because a message cannot be notified by the storage channel in real time can be avoided. Therefore, when the message network link is faulty, normal communication between hosts is ensured using the storage channel; and when the message network link recovers to normal, the message transmission channel is switched back to the message network link in time, and efficiency of communication between hosts is ensured.

The following describes a working principle of the storage channel. A communications file is configured in the data storage medium in the cluster file system, and the communications file is a channel for message exchange that is used when the hosts communicate with each other using the storage channel. The communications file may be configured in any area of the cluster file system, for example, may be located in a metadata area of the data storage medium.

It is assumed that the cluster file system includes N hosts, N≥2, and N is a positive integer. A layout of the communications file is an N×N two-dimensional matrix, that is, an N-order square matrix. Each element other than a diagonal in the matrix represents a single channel from a source node to a destination node such that a storage channel from any source node to any destination node is independent of each other. In this embodiment of this application, a "node" is equivalent to a "host". For example, an element in an $i^{th}$ row and a $j^{th}$ column of the N-order square matrix represents a location area ij, the location area ij is used by an $i^{th}$ host to record a message to be sent to a $j^{th}$ host, and is used by the $j^{th}$ host to access and read the message recorded by the $i^{th}$ host, where 1≤i≤N, 1≤j≤N, i and j are both positive integers, and i≠j.

Figure 5:
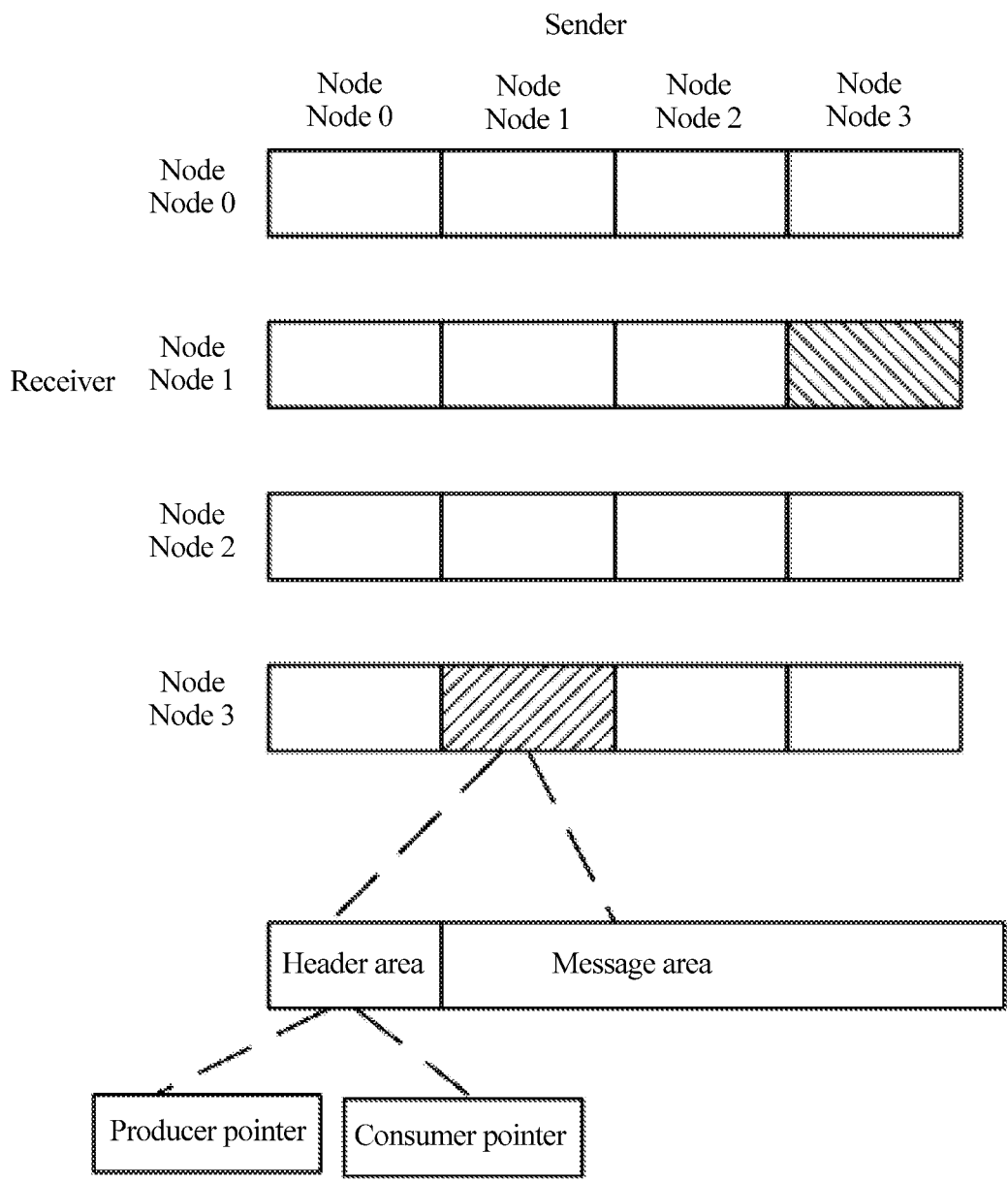
FIG. 5 is a schematic diagram of an architecture of a communications file according to an embodiment of this application.

As shown in FIG. 5, it is assumed that N=4, that is, there are four hosts in the cluster file system, which are respectively represented by a Node 0, a Node 1, a Node 2, and a Node 3, and each element other than a diagonal in FIG. 5 represents a single channel from a source node to a destination node. It is assumed that a column of the matrix represents a sender, and a row represents a receiver. In this case, each element other than the diagonal in FIG. 5 is used by a node in a corresponding column to record a message to be sent to a node in a corresponding row, and is used by the node in the corresponding row to access and read the message recorded by the node in the corresponding column. For example, a location area represented by an element with leftward slashes in FIG. 5 is used by the node 1 to record a message to be sent to the node 3, and is used by the node 3 to poll the area and read the message recorded by the node 1. A location area represented by an element with rightward slashes in FIG. 5 is used by the node 3 to record a message to be sent to the node 1, and is used by the node 1 to poll the area and read the message recorded by the node 3.

A location area represented by each element other than the diagonal in the matrix is a channel, and each channel includes a header area (that is, a head) and a message area (that is, a body). For example, each channel includes a head of 2 kilobyte (KB) and a body of 64 KB, and occupies disk space of approximately 140 MB in total.

A message area of a channel records a message transmitted between nodes, and a header area of the channel includes a producer pointer and a consumer pointer, which are indexes that point to a message in the message area. In a location area in the matrix, a producer index points to a location in which a sender host records a message, and a consumer index points to a location in which a receiver host reads a message. Optionally, sizes of the producer pointer and the consumer pointer are respectively 1.5 KB and 0.5 KB.

When a sender host generates a message, and is to send the message to a receiver host, the sender host writes the message into a body of a location area corresponding to the receiver host in the matrix, and updates a producer index to a last location in which the message is currently written. The receiver host polls the producer index and a consumer index in a head of the location area according to a specified period. When it is determined that the producer index is greater than the consumer index, it indicates that a new message is not read, and the message is read from the body and processed. Each time a message is read, the consumer index is updated to a location in which the message is currently read, until the consumer index is equal to the producer index. If a producer index and a consumer index in a location area exceed a buffer boundary, a part that has been read is reset to 0, to implement a lock-free queue in a ring shape.

In the foregoing step 403, the second location area is a location area in which the second host stores a message to be sent to the first host, and the first host polls and accesses the second location area, and reads the message sent by the second host.

In an embodiment, the first host accesses the second location area of the data storage medium, queries a first index and a second index that are carried in a header area of the second location area, and reads an unread message when determining, according to the first index and the second index, that there is the unread message. The first index is used to represent a location that is in the second location area and in which the first host reads a message, and the second index is used to represent a location that is in the second location area and in which the second host records a message.

In conclusion, this embodiment of this application mainly modifies an implementation mechanism of the message network layer. When the host detects that the message network is faulty, a message related to the distributed lock layer is handed over from a message network channel to the storage channel for transferring. In this way, normal communication between hosts can be ensured when the message network of the cluster file system is faulty, and it is ensured that the service is not interrupted.

In this embodiment of this application, four core processes are involved in a message transmission process of any host, including:

A dlm_serve process: The process is a user of the message network layer, and includes a distributed-lock-related process and a common file access process. A message is synchronously sent in the process using a message sending interface provided by the message network layer.

A net_wq process: The net_wq is a kernel working queue thread used by the message network layer. Each host runs one net_wq process, and is responsible for processing connection of the message network, receiving or sending a heartbeat, receiving and processing a message capsule, and processing timeout. The net_wq process is a core process of the whole message network layer.

An msg_disk process: responsible for polling and reading a communications file in order to obtain a message on the storage channel. Each host enables an msg_disk process for each attached volume, and disables the process when the volume is detached.

A disk_hb process: The process updates a heartbeat of the host to the data storage medium every two seconds and reads a heartbeat of another host in order to determine working statuses of hosts in the cluster. Each data storage is corresponding to a disk heartbeat process.

The following further describes the solutions provided in the embodiments of this application in detail with reference to a specific application scenario.

Figure 6:
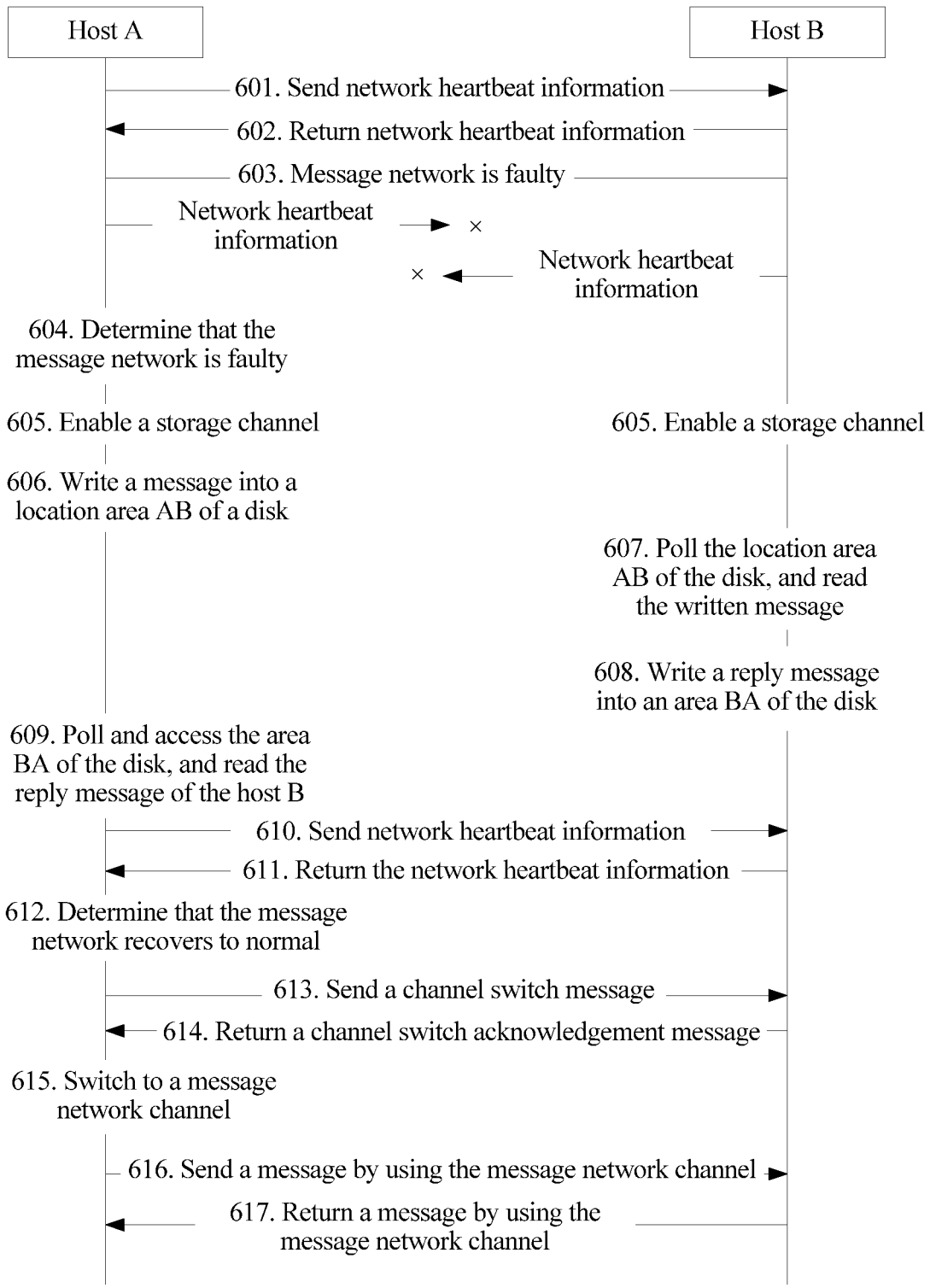
FIG. 6 is a second flowchart of a message transmission method in a cluster file system according to an embodiment of this application.

The cluster file system includes a host A and a host B, and the data storage medium is a disk. As shown in FIG. 6, a method procedure of exchanging a message between the host A and the host B is as follows.

Step 601: The host A sends network heartbeat information to the host B through a message network.

Step 602: The host B returns network heartbeat information to the host A through the message network.

If network heartbeat returning is normal, it indicates that the message network is normally connected.

Step 603: The message network is faulty, and the host A is disconnected from the host B.

When the message network is faulty, the host A cannot send network heartbeat information to the host B through the message network, and the host B cannot return network heartbeat information to the host A through the message network.

Step 604: The host A receives no network heartbeat information of the host B in a preset time, and then determines that the message network between the host A and the host B is faulty.

In actual application, the host A triggers a timer to perform timing when receiving no network heartbeat information, and then after a specified time, determines that the host A is disconnected from the host B. For example, the specified time is 20 s.

Correspondingly, the host B receives no network heartbeat information of the host A in a preset time, and then determines that the message network between the host A and the host B is faulty.

The foregoing step 601 to step 604 are processed by the net_wq process of the host.

Step 605: The host A enables a storage channel, that is, switches a message channel between the host A and the host B from the message network channel to the storage channel.

In an actual application, once the host A determines that the host A is disconnected from the host B, the host A enables the storage channel at the same time when attempting to perform reconnection for the first time in order to ensure communication between the host A and the host B.

Correspondingly, the B enables the storage channel, that is, switches the message channel between the host A and the host B from the message network channel to the storage channel.

In an embodiment, the host A enables an msg_disk process, to poll a location area BA in a two-dimensional matrix of the disk. The host B enables an msg_disk process, to poll a location area AB in the two-dimensional matrix of the disk.

Step 606: In a dlm_serve process, the host A needs to send a message to the host B, and then writes the message into a location area AB of the disk.

For example, when the host A needs to write a file, the host A sends a lock request message to the host B.

Step 607: In an msg_disk process, the host B polls and accesses the location area AB of the disk, and reads the message written by the host A.

Step 608: The host B writes a reply message into an area BA of the disk.

The host B reads, by polling the location area AB of the disk, the lock request message written by the host A, and after determining that locking succeeds, writes the reply message into the area BA of the disk.

Step 609: In an msg_disk process, the host A polls and accesses the area BA of the disk, and reads the reply message of the host B.

After the host A reads the message indicating that locking succeeds, the host A can write the file.

When exchanging a message using the storage channel, the host A and the host B simultaneously monitor whether the message network is recovered, that is, sending network heartbeat information to each other. The following procedure is steps that are performed after the message network is recovered.

Step 610: The host A sends network heartbeat information to the host B.

Correspondingly, the host B sends network heartbeat information to the host A.

Step 611: The host B returns network heartbeat information to the host A.

Correspondingly, the host A returns network heartbeat information to the host B.

Step 612: After receiving the network heartbeat information of the host B, the host A determines that the message network recovers to normal, and successfully reconnects to the host B.

Correspondingly, after receiving the network heartbeat information of the host A, the host B determines that the message network recovers to normal, and successfully reconnects to the host A.

Step 613: The host A sends a channel switch message to the host B, that is, switch from the storage channel to the message network channel.

Step 614: When receiving the channel switch message from the host A, the host B returns a channel switch acknowledgement message (that is, an ACK message) to the host A, and marks a message transmission channel as the message network channel.

Step 615: After receiving the ACK message, the host A switches the message transmission channel from the storage channel to the message network channel, and marks the message transmission channel as the message network channel.

Step 616: The host A sends a message to the host B using the message network channel.

Step 617: The host B returns a message to the host A using the message network channel.

Before exchanging a message using the message network channel again, the host A and the host B need to query whether there is an unread message. In an embodiment, the host A re-polls the location area BA of the storage channel, and receives and processes a message that is not received in the location area BA of the storage channel. The host B re-polls the location area AB of the storage channel, and receives and processes a message that is not received in the location area AB of the storage channel.

It can be learned from the foregoing description that according to the method provided in this embodiment of the application, after the message network is interrupted for a specified time (for example, 20 seconds (s)), the message transmission channel is switched to the storage channel such that the host A can still normally access the disk, a service interruption time is less than or equal to 20 s or shorter, and availability of the cluster file system and service continuity are greatly improved.

Figure 7:
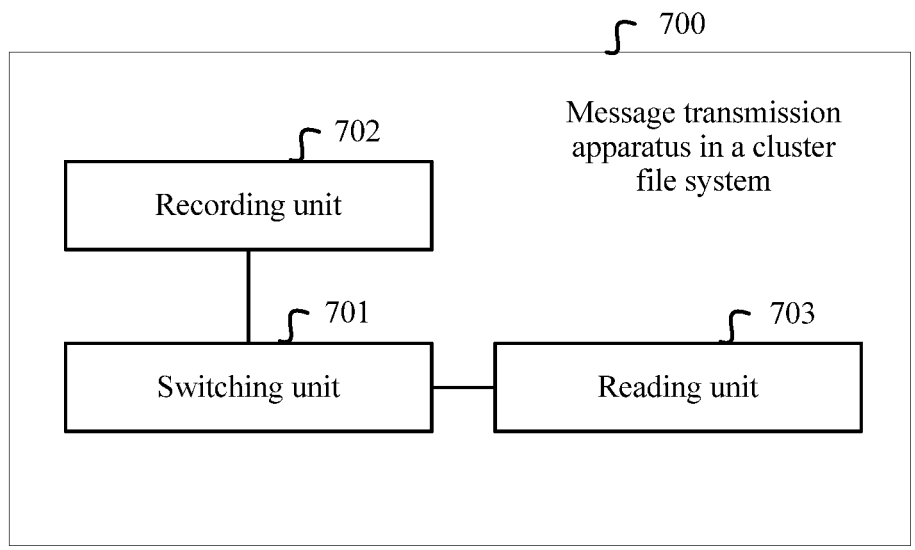
FIG. 7 is a first schematic structural diagram of a message transmission apparatus in a cluster file system according to an embodiment of this application.

Based on a same inventive concept as the method shown in FIG. 4, as shown in FIG. 7, an embodiment of this application further provides a message transmission apparatus 700 in a cluster file system. The message transmission apparatus 700 in the cluster file system is applied to a first host. The cluster file system includes the first host, a second host, a message network link, and a data storage medium. The message network link is used for message transmission between the first host and the second host, the data storage medium is configured to store file information of the cluster file system, and the message transmission apparatus 700 in the cluster file system includes a switching unit 701 configured to determine that the message network link is faulty, and switch a message transmission channel from the message network link to a storage channel, where the storage channel is used by the first host and the second host to perform message transmission using the data storage medium; a recording unit 702 configured to, after the switching unit 701 switches the message transmission channel from the message network link to the storage channel, when generating a first message to be sent to the second host, record the first message in a first location area of the data storage medium, where the first location area is used by the second host to access and read the first message; and a read unit 703 configured to, after the switching unit 701 switches the message transmission channel from the message network link to the storage channel, access a second location area of the data storage medium, and read a second message that is recorded by the second host in the second location area.

Optionally, the switching unit 701 is further configured to monitor the message network link, and after determining that the message network link recovers to normal, switch the message transmission channel from the storage channel to the message network link.

Optionally, the cluster file system includes N hosts, the data storage medium includes an N-order square matrix, an element in an $i^{th}$ row and a $j^{th}$ column of the N-order square matrix represents a location area ij, the location area ij is used by an $i^{th}$ host to record a message to be sent to a $j^{th}$ host, and is used by the $j^{th}$ host to access and read the message recorded by the $i^{th}$ host, where N≥2, 1≤i≤N, 1≤j≤N, i, j, and N are positive integers, and i≠j.

Optionally, the read unit 703 is configured to access the second location area of the data storage medium, query a first index and a second index that are carried in a header area of the second location area, and read an unread message when determining, according to the first index and the second index, that there is the unread message, where the first index is used to represent a location that is in the second location area and in which the first host reads a message, and the second index is used to represent a location that is in the second location area and in which the second host records a message.

Based on a same inventive concept as the method shown in FIG. 4, as shown in FIG. 7, an embodiment of this application further provides a message transmission apparatus 800 in a cluster file system. The message transmission apparatus 800 in the cluster file system is applied to a first host. The cluster file system includes the first host, a second host, a message network link, and a data storage medium. The message network link is used for message transmission between the first host and the second host, the data storage medium is configured to store file information of the cluster file system, and the message transmission apparatus 800 in the cluster file system includes a transceiver 801, a processor 802, a memory 803, and a bus 804. The transceiver 801, the processor 802, and the memory 803 are connected to the bus 804. The memory 803 stores a group of programs, and the processor 802 is configured to invoke the program stored in the memory 803 to execute the following operations, for instance, determining that the message network link is faulty, and switching a message transmission channel from the message network link to a storage channel, where the storage channel is used by the first host and the second host to perform message transmission using the data storage medium; after the message transmission channel is switched from the message network link to the storage channel, when generating a first message to be sent to the second host, recording the first message in a first location area of the data storage medium, where the first location area is used by the second host to access and read the first message; and after the message transmission channel is switched from the message network link to the storage channel, accessing a second location area of the data storage medium, and reading a second message that is recorded by the second host in the second location area.

Optionally, the processor 802 is further configured to monitor the message network link, and after determining that the message network link recovers to normal, switch the message transmission channel from the storage channel to the message network link.

Optionally, the cluster file system includes N hosts, the data storage medium includes an N-order square matrix, an element in an $i^{th}$ row and a $j^{th}$ column of the N-order square matrix represents a location area ij, the location area ij is used by an $i^{th}$ host to record a message to be sent to a $j^{th}$ host, and is used by the $j^{th}$ host to access and read the message recorded by the $i^{th}$ host, where N≥2, 1≤i≤N, 1≤j≤N, i, j, and N are positive integers, and i≠j.

Optionally, the processor 802 is further configured to access the second location area of the data storage medium, query a first index and a second index that are carried in a header area of the second location area, and read an unread message when determining, according to the first index and the second index, that there is the unread message, where the first index is used to represent a location that is in the second location area and in which the first host reads a message, and the second index is used to represent a location that is in the second location area and in which the second host records a message.

The processor 802 may be a central processing unit (CPU), a network processor (NP), or a combination of a CPU and an NP.

The processor 802 may further include a hardware chip. The hardware chip may be an application-specific integrated circuit (ASIC), a programmable logic device (PLD), or a combination thereof. The PLD may be a complex programmable logical device (CPLD), a field-programmable gate array (FPGA), generic array logic (GAL), or any combination thereof.

The memory 803 may include a volatile memory such as a random-access memory (RAM); the memory 803 may include a nonvolatile memory (non-volatile memory), for example, a flash memory, a hard disk drive (HDD), or a solid-state drive (SSD); or the memory 803 may include a combination of the foregoing memories.

Figure 8:
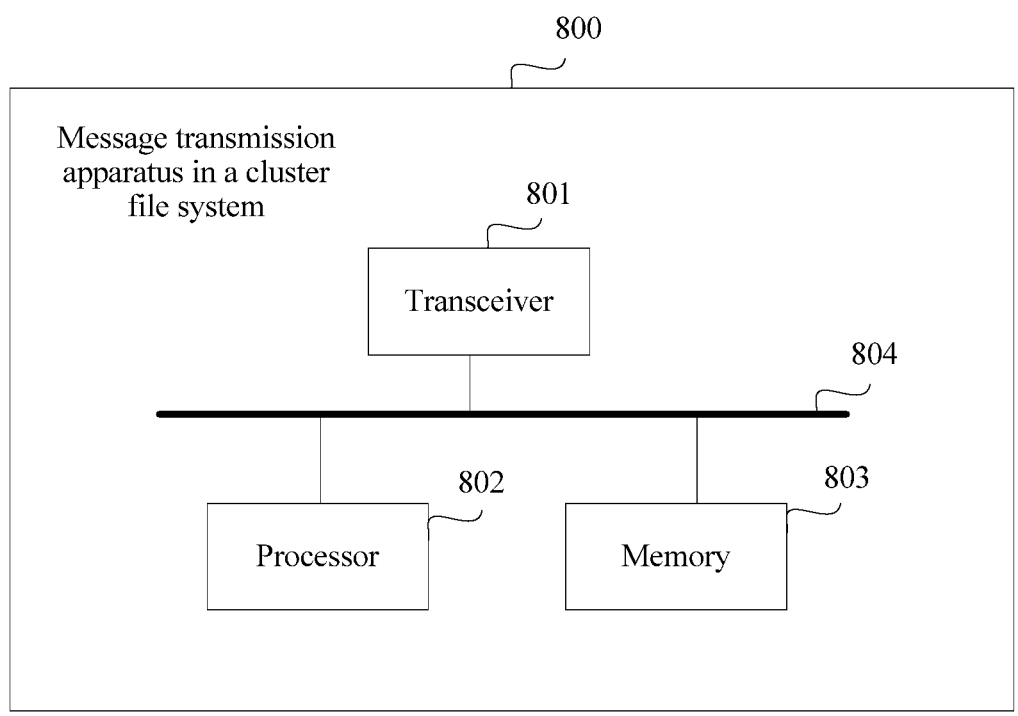
FIG. 8 is a second schematic structural diagram of a message transmission apparatus in a cluster file system according to an embodiment of this application.

Both the message transmission apparatus 700 in the cluster file system shown in FIG. 7 and the message transmission apparatus 800 in the cluster file system shown in FIG. 8 are used for executing the method shown in FIG. 4. The switching unit 701, the recording unit 702, and the reading unit 703 in FIG. 7 may be implemented using the processor 802 in FIG. 8.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of the present disclosure. This application is intended to cover these modifications and variations provided that they fall within the scope of protection defined by the following claims and their equivalent technologies.

What is claimed is:

1. A message transmission method implemented by a first host in a cluster file system, comprising:
    determining that a message network link is faulty with a second host, wherein the message network link is used for message transmission between the first host and the second host;
    switching a message transmission channel from the message network link to a storage channel, wherein the storage channel connects the first host and a data storage medium and connects the second host and the data storage medium;
    performing message transmission with the second host using the data storage medium;
    generating a first message to be sent to the second host;
    recording the first message in a first location area of the data storage medium to enable the second host to access and read the first message, wherein the first location area is used to record the first message for access by the second host and is used by the second host to read the first message recorded by the first host;
    accessing a second location area of the data storage medium; and
    reading, in the second location area, a second message from the second host.

2. The message transmission method of claim 1, further comprising monitoring the message network link to determine that the message network link is faulty.

3. The message transmission method of claim 2, further comprising switching the message transmission channel from the storage channel to the message network link after the message network link has recovered to normal.

4. The message transmission method of claim 1, wherein the cluster file system comprises N hosts, wherein the data storage medium comprises an N-order square matrix, wherein an element in an $i^{th}$ row and a $j^{th}$ column of the N-order square matrix represents a location area ij, wherein the location area ij is used by an $i^{th}$ host to record a message to be sent to a $j^{th}$ host, wherein the location area ij is used by the $j^{th}$ host to access and read the message recorded by the $i^{th}$ host, wherein N≥2, wherein 1≤i≤N, wherein 1≤j≤N, wherein i, j, and N are positive integers, and wherein i≠j.

5. The message transmission method of claim 1, wherein accessing the second location area of the data storage medium, and reading the second message from the second host comprises:
    querying a first index and a second index in a header area of the second location area; and
    reading an unread message when determining there is the unread message in the second location area, wherein the first index represents a location in the second location area where the first host reads the second message, and wherein the second index represents a location in the second location area where the second message from the second host is obtained.

6. The message transmission method of claim 1, further comprising:
    monitoring the message network link; and
    switching the message transmission channel from the storage channel to the message network link after determining that the message network link returns to normal.

7. A message transmission apparatus of a first host in a cluster file system, comprising:
    a memory comprising instructions;
    a processor coupled to the memory and configured to execute the instructions, wherein the instructions cause the processor to be configured to:
        determine that a message network link is faulty with a second host, wherein the message network link is used for message transmission between the first host and the second host;
        switch a message transmission channel from the message network link to a storage channel, wherein the storage channel connects the first host and a data storage medium and connects the second host and the data storage medium;
        perform message transmission with the second host using the data storage medium;
        generate a first message to be sent to the second host;
        record the first message in a first location area of the data storage medium to enable the second host to access and read the first message, wherein the first location area is used to record the first message for access by the second host and is used by the second host to read the first message recorded by the first host;

access a second location area of the data storage medium after switching the message transmission channel from the message network link to the storage channel; and read, in the second location area, a second message from the second host.

8. The message transmission apparatus of claim 7, wherein the instructions further cause the processor to be configured to monitor the message network link to determine that the message network link is faulty.

9. The message transmission apparatus of claim 8, wherein the instructions further cause the processor to be configured to switch the message transmission channel from the storage channel to the message network link after determining that the message network link recovers to normal.

10. The message transmission apparatus of claim 7, wherein the cluster file system comprises N hosts, wherein the data storage medium comprises an N-order square matrix, wherein an element in an $i^{th}$ row and a $j^{th}$ column of the N-order square matrix represents a location area ij, wherein the location area ij is used by an $i^{th}$ host to record a message to be sent to a $j^{th}$ host, wherein the location area ij is used by the $j^{th}$ host to access and read the message recorded by the $i^{th}$ host, wherein N≥2, wherein 1≤i≤N, wherein 1≤j≤N, wherein i, j, and N are positive integers, and wherein i≠j.

11. The message transmission apparatus of claim 7, wherein the instructions further cause the processor to be configured to:

access the second location area of the data storage medium;

query a first index and a second index in a header area of the second location area; and read an unread message when determining there is the unread message in the second location area, wherein the first index represents a location in the second location area where the first host reads the second message, and wherein the second index represents a location in the second location area where the second message from the second host records is obtained.

12. The message transmission apparatus of claim 7, wherein the instructions further cause the processor to be configured to:

monitor the message network link; and switch the message transmission channel from the storage channel to the message network link after determining that the message network link returns to normal.

13. A cluster file system, comprising:

M hosts, wherein M is a positive integer greater than 1;

a message network link configured for message transmission between any two of the M hosts;

a data storage medium coupled to the M hosts and configured to store file information of the cluster file system, wherein a storage channel connects any of the M hosts and the data storage medium, wherein the any two hosts perform message transmission using the data storage medium, and wherein the any of the M hosts comprises a message transmission apparatus comprising:

a memory comprising instructions;

a processor coupled to the memory and configured to execute the instructions, wherein the instructions cause the processor to be configured to:

determine that a message network link is faulty with a second host, wherein the message network link is used for message transmission between a first host and the second host, and wherein the M hosts comprises the first host and the second host;

switch a message transmission channel from the message network link to a storage channel, wherein the storage channel connects the first host and the data storage medium and connects the second host and the data storage medium;

perform message transmission with the second host using the data storage medium;

generate a first message to be sent to the second host;

record the first message in a first location area of the data storage medium to enable the second host to access and read the first message, wherein the first location area is used to record the first message for access by the second host and is used by the second host to read the first message recorded by the first host;

access a second location area of the data storage medium after switching the message transmission channel from the message network link to the storage channel; and read, in the second location area, a second message from the second host.

14. The cluster file system of claim 13, wherein the instructions further cause the processor to be configured to monitor the message network link to determine that the message network link is faulty.

15. The cluster file system of claim 13, wherein the instructions further cause the processor to be configured to switch the message transmission channel from the storage channel to the message network link after determining that the message network link recovers to normal.

16. The cluster file system of claim 13, wherein the data storage medium comprises an M-order square matrix, wherein an element in an $i^{th}$ row and a $j^{th}$ column of the M-order square matrix represents a location area ij, wherein the location area ij is used by an $i^{th}$ host to record a second message to be sent to a $j^{th}$ host, wherein the location area ij is used by the $j^{th}$ host to access and read a message recorded by the $i^{th}$ host, wherein M≥2, wherein 1≤i≤M, wherein 1≤j≤M, wherein i and j are positive integers, and wherein i≠j.

17. The cluster file system of claim 13, wherein the instructions further cause the processor to be configured to:

access the second location area of the data storage medium;

query a first index and a second index in a header area of the second location area; and read an unread message when determining that there is the unread message in the second location area, wherein the first index represents a location in the second location area where the first host reads the second message, and wherein the second index represents a location in the second location area where the second message from the second host records is obtained.

* * * * *

UNITED STATES PATENT AND TRADEMARK OFFICE
CERTIFICATE OF CORRECTION

PATENT NO. : 11,184,435 B2  
APPLICATION NO. : 16/552817  
DATED : November 23, 2021  
INVENTOR(S) : Fu et al.

Page 1 of 1

It is certified that error appears in the above-identified patent and that said Letters Patent is hereby corrected as shown below:

In the Claims

Claim 10, Column 15, Line 26: "a message to be" should read "a second message to be"

Claim 10, Column 15, Line 27: "the message" should read "a message"

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*